United States Patent Office 2,981,749
Patented Apr. 25, 1961

2,981,749
PROCESS FOR THE PRODUCTION OF ω-HALOGEN CARBOXYLIC ACID NITRILES

Heinrich Brendlein, Hanau-Hohe Tanne, Hans Huemer, Königstein I. Taunus, Theodor Lüssling, Hanau, and Hermann Schulz, Frankfurt am Main, Germany, assignors to Deutsche Gold- und Silber-Scheideanstalt vormals Roessler, Frankfurt am Main, Germany No Drawing. Filed Sept. 2, 1958, Ser. No. 758,602

Claims priority, application Germany Sept. 10, 1957

5 Claims. (Cl. 260—465.3)

The present invention relates to an improved process for the production of ω-halo carboxylic acid nitriles by telomerization of olefinic hydrocarbons and cyanogen halides.

The production of α-halo carboxylic acid nitriles by telomerization of ethylene and a cyanogen halide is already known. The process can be carried out batchwise or continuously in the presence or absence of solvents at elevated temperatures and pressures. Radical forming catalysts, such as organic peroxides, aliphatic azo compounds and the like, are employed as catalysts for this reaction.

According to the invention it was unexpectedly found that the yields of ω-halo carboxylic acid nitriles produced in such telomerization reaction could be substantially improved when starting materials which are as free of water as possible are employed. It was also found advantageous when the telomerization is carried out in the absence of free hydrogen halide.

The water content of the cyanogen halide should be kept as such as possible under 0.1% and preferably below 0.02%. The cyanogen halide can, according to the invention, be best free from moisture by passing it in vapor form over solid, preferably granulated, magnesium perchlorate which, if desired, can be admixed with an equal quantity of an inert filler to improve its permeability or by passing it over predried silica gel.

The water content of the olefinic hydrocarbon also should according to the invention be kept as much as possible under 0.1%, preferably under 0.01%. The olefinic hydrocarbon can be dried in a known manner, such as, for example, by freezing out the moisture content and the like.

The presence of hydrogen halide can catalyze the cyclic trimerization of the cyanogen halide to a cyanuric halide. Water acts hydrolytically upon the cyanogen halide with the formation of hydrohalide, cyanic acid, cyanuric acid and higher polymerization products. The by-products thus produced are primarily solid products which are insoluble in the starting materials as well as the telomerization product. As a consequence, in continuous operation of the process the apparatus is soon clogged so that a long continued operation without interruption is impossible.

It was found that the cyanogen halide can be freed from hydrogen halide by passing it in vapor form at temperatures between 13° and 100° C., preferably at about 40° C., or in liquid form over a hydrogen halide binding agent, expediently over a mixture of an alkaline earth oxide and alkaline earth hydroxide, preferably lime. It is expedient to reduce the concentration of the hydrogen halide in the cyanogen halide to as low a value as possible, preferably below 0.1%. Also, the unconverted cyanogen halide which is recycled in a continuous process can also be freed in this manner from hydrogen halide which, for example, is produced by thermal decomposition of the reaction products.

The disturbing trimerization of the cyanogen halide in addition to being catalyzed by hydrohalic acid is also catalyzed by iron or its compounds. As a consequence, it is expedient to carry out the telomerization in apparatus of silver, gold, tantalum, titanium or highly alloyed steels or apparatus clad with such metals. The apparatus also can, for example, be clad with a synthetic resin, such as polytetrafluorethylene.

When these measures are taken it is impossible according to the invention considerably to lengthen the time the telomerization of, for example, ethylene/cyanogen chloride or propylene/cyanogen chloride can be continued without occurrence of solid deposits in the reaction vessel.

The following examples will serve to illustrate several embodiments of the invention.

Example 1

Cyanogen chloride vapor was first passed through a tower containing a mixture of calcium oxide and calcium hydroxide. The tower was heated to 40° C. to prevent liquefaction of the cyanogen chloride. The vapor was then cooled to condense the cyanogen chloride and distilled from a retort containing a mixture of 4 parts by weight of calcium oxide and 1 part by weight of calcium hydroxide to bind the remaining free hydrogen chloride and the vapors passed through a column containing 3 kg. of granular magnesium perchlorate and an equal quantity of Raschig rings to improve the permeability thereof. The quantity of magnesium perchlorate employed was sufficient to reduce the moisture content of 650 kg. of cyanogen chloride from a moisture content of 0.08 to 0.2% to a moisture content below 0.02%. After liquefaction of the dried cyanogen chloride, 1.25% of azo di-isobutyric acid nitrile was dissolved therein as the telomerization catalyst. A silver clad V2A steel reaction tube 6.30 meters long and 35 mm. in diameter was employed for the telomerization. 1.18 kg. of cyanogen chloride per hour containing 1.25% of the catalyst were introduced into the tube in finely divided form. At the same time, 1.42 kg. of ethylene with a dew point below −40° C. (this corresponds to about 100 mg. water per cubic meter of ethylene) were withdrawn from a bottle, passed over a cooler maintained at −15° C. together with the gas recycled from the reaction which primarily consisted of unconverted starting materials, and over a preheater containing Raschig rings heated to 120° C. and then into the reaction tube. The reaction tube was maintained at a temperature of 150° C. and under 150 atmospheres' gauge pressure by the quantity of ethylene added. The crude telomerization product (ω-chloronitriles) were freed from dissolved cyanogen chloride by distillation. The cyanogen chloride thus recovered is passed in vapor form over a mixture of calcium oxide and hydroxide to remove the hydrogen chloride produced by thermal decomposition in the reaction tube and during the distillation and then mixed with the fresh cyanogen chloride in the retort from which it is distilled. In a 14 day run, 220 kg. of an ω-chloronitrile mixture with a chlorine content of 21.0% were produced.

When the removal of the residual moisture content of the cyanogen chloride by distillation over magnesium perchlorate was omitted and in addition ethylene was employed which had not been specially dried but with the other reaction conditions the same as in Example 1, the ethylene/cyanogen chloride telomerization could only be continuously carried out for 4 days in the reaction tube because of deposit of solids in the reaction tube. The ethylene employed was withdrawn from a gasometer sealed with a 25% aqueous NaCl solution and subsequently dried over caustic soda. In this 4 days' run with a 1.45 kg. per hour supply of cyanogen chloride, a total of 34.9 kg. of ω-chloronitriles with a chlorine content of 23% were produced.

In a further test the cyanogen chloride again was not dried by distillation over magnesium perchlorate but ethylene with a dew point below —40° C. was used. 1.24 kg. per hour of the cyanogen chloride containing 1.25% of azo-di-isobutyric acid nitrile as the catalyst and 1.50 kg. per hour of the ethylene were converted in the reaction tube described in Example 1 at 150° C. and 150 atmospheres' gauge pressure. The ethylene, as well as the recycled unconverted starting materials were preheated to 120° C. with the Raschig ring filled preheater. The test had to be discontinued after 5½ days' run because of the deposit of solids in the tube. During this test, 107.2 kg. of ω-chloronitriles with a chlorine content of 20.6% were produced.

*Example 2*

1.92 kg. of propylene and 1.52 kg. of cyanogen chloride with the addition of 1.25% of azo-di-isobutyric acid nitrile were supplied to the reaction tube per hour at a temperature of 160° C. and a pressure of 200 atmospheres' gauge pressure but otherwise under the same conditions as described in Example 1. Under the exclusion of hydrogen chloride and moisture this test could be carried out continuously for 17 days. 77.4 kg. of a ω-chloronitrile mixture with a chlorine content of 18% were produced.

*Example 3*

222 g. of silica gel (500 cc.) were heated to 170–180° C. in a V2A tube 1.1 meters long having an inner diameter of 40 mm. and predried by passing 10 liters per hour of nitrogen therethrough. The predried silica gel was cooled to room temperature and 100 liters per hour of cyanogen chloride passed thereover. In this way, 16 kg. of cyanogen chloride were dried from a moisture content of 0.1% to a moisture content below 0.02% without noticeable reduction of the effectiveness of the silica gel. The thus predried cyanogen chloride was after addition of the catalyst converted with ethylene to ω-chloronitriles as described in Example 1.

We claim:
1. In a process for the telomerization of an olefinic hydrocarbon selected from the group consisting of ethylene and propylene and cyanogen chloride in the presence of a radical forming catalyst in a reaction space maintained at an elevated temperature up to 160° C. and pressure up to 200 atmospheres to produce ω-chloronitriles, the step which comprises supplying the olefinic hydrocarbon and the cyanogen chloride to said reaction space, the moisture content of said olefine and said cyanogen chloride each being kept substantially under 0.1% and the free hydrogen halide content of each of said olefine and said cyanogen chloride supplied to the reaction space being kept under 0.1%.

2. The process of claim 1 in which the moisture content of the olefinic hydrocarbon and cyanogen chloride supplied to the reaction space is below 0.02%.

3. The process of claim 1 in which the cyanogen chloride is predried by passing it in vapor form over solid magnesium perchlorate prior to introduction into the reaction space.

4. The process of claim 1 in which the cyanogen chloride is predried by passing it in vapor form over predried silica gel prior to introduction into the reaction space.

5. The process of claim 1 in which the cyanogen chloride is treated with a mixture of calcium oxide and hydroxide to remove hydrogen halide prior to introduction into the reaction space.

References Cited in the file of this patent
UNITED STATES PATENTS

| | | |
|---|---|---|
| 2,419,488 | Dutcher | Apr. 22, 1947 |
| 2,689,868 | Thurston | Sept. 21, 1954 |
| 2,768,196 | Huemer et al. | Oct. 23, 1956 |
| 2,833,808 | Brendlein | May 6, 1958 |
| 2,848,476 | Kohlhase et al. | Aug. 19, 1958 |
| 2,848,477 | Kohlhase | Aug. 19, 1958 |

OTHER REFERENCES

Weissberger: Part I, "Separation and Purification" (Technique of Organic Chemistry), 1956, page 815, volume III, second edition.